Oct. 25, 1949.  O. JACOBSEN  2,485,831
PLUG COCK VALVE
Filed June 24, 1944
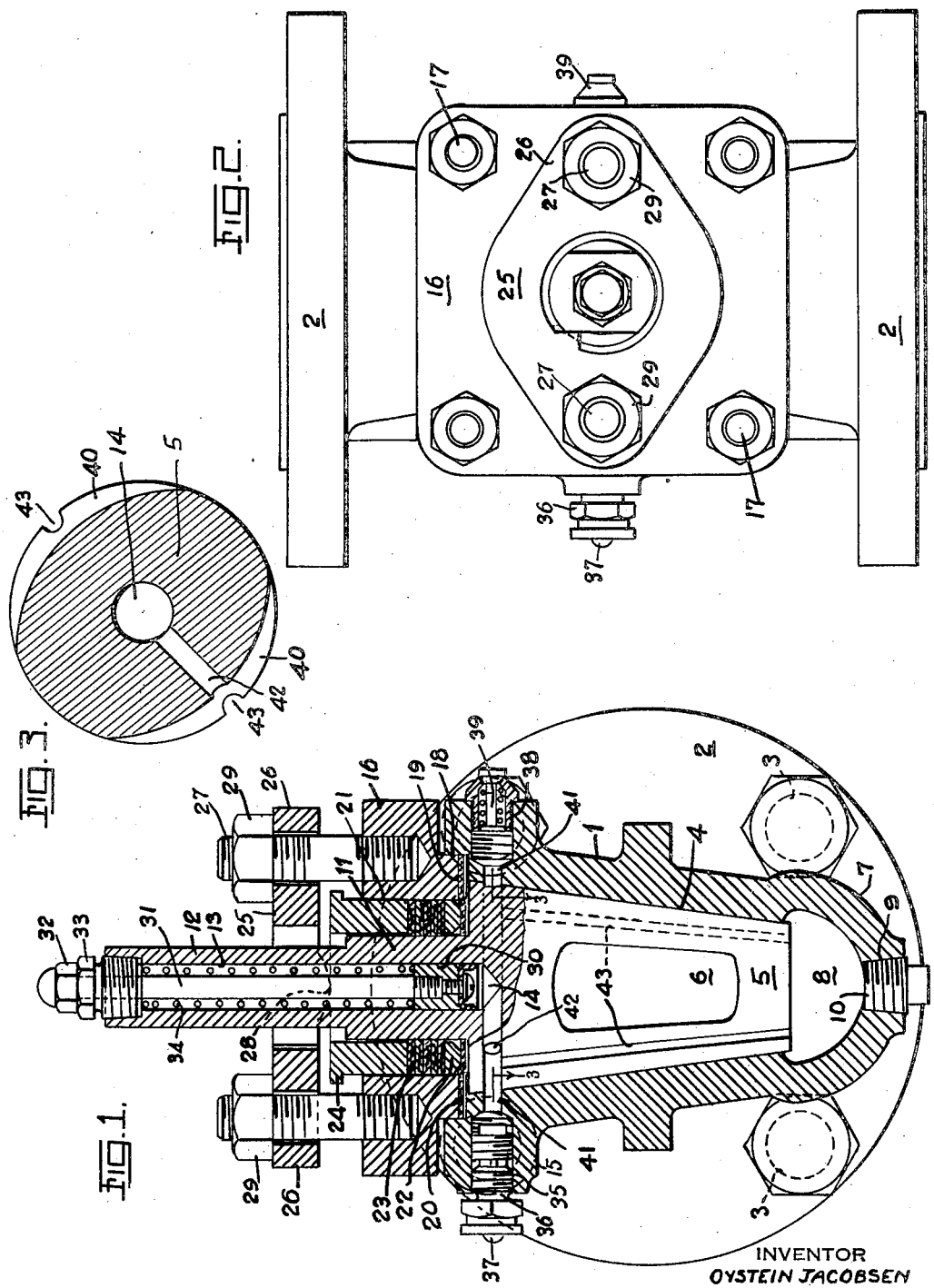
INVENTOR
*OYSTEIN JACOBSEN*
BY
*Toulmin + Toulmin*
ATTORNEYS Patented Oct. 25, 1949

2,485,831

UNITED STATES PATENT OFFICE 2,485,831

PLUG COCK VALVE

Oystein Jacobsen, Montgomery County, Ohio, assignor to The Duriron Company, Inc., Dayton, Ohio, a corporation of New York Application June 24, 1944, Serial No. 541,861

5 Claims. (Cl. 251—93)

The present invention relates to valves for controlling the flow of fluids and more particularly to those valves of the plug cock type.

Inasmuch as the bearing surface of the plug contacts directly the seat of the valve body or casing considerable friction will be developed at the bearing surface unless there is adequate provision for lubrication. Moreover, when handling liquids of a readily corrodible character, such as those containing acids, precipitates are apt to form at the valve seat which tend to glue or to freeze the plug in its last seat position. Consequently, it becomes necessary to provide the plug and/or the valve casing at the seat with lubricating passageways so arranged that when the plug is moved between its valve open and valve closed positions adequate lubrication is supplied to the bearing surfaces.

A number of lubricating systems and arrangements have been heretofore proposed for this purpose but many of them are open to certain objections, among which are:

(1) The lubricant is permitted to remain in some of the passageways indefinitely and even the smallest seepage or leakage of the controlled fluid past the seating surfaces tends to dilute and to render ineffective the lubricating qualities of the lubricant.

(2) The stagnation of the lubricant in some of the passageways may promote the collection of foreign materials such as grit, dust or other solid particles carried by the fluid so that instead of reducing the friction between the plug and its seat, actually it may in time increase this friction.

(3) The prior art lubricating systems were often such that when fresh lubricant was introduced into a valve having criss-cross passageways the flow of lubricant under pressure would tend to take the easiest path through the passageways so that some of the latter would not receive any lubricant during the re-charging operation.

The primary object of the invention is to eliminate the disadvantages set forth above and more particularly to provide a plug valve with a lubricating structure and arrangement such that all seating portions of the plug are adequately lubricated during the life of the valve.

Another object is to provide a plug valve with an improved lubricating system by which the latter may be cleaned or flushed conveniently to remove the "dead" lubricant or contaminated lubricant and fresh lubricant may be readily supplied to all parts of the system with the assurance that no part will fail to receive its share of the introduced lubricant.

A further object is to provide in connection with a plug cock valve a system of lubricating passageways which permit the introduction of a cleansing fluid to all of the seating surfaces prior to the introduction of lubricant so as to remove any tendency for foreign material to lodge between the plug and its seat.

The invention will be better understood when reference is made to the following description and the accompanying drawings in which:

Figure 1 shows a vertical sectional view taken down through the middle of the valve and plug but the plug element has been shown in elevation.

Figure 2 is a plan view looking down on top of the improved valve.

Figure 3 is a sectional view taken along line 3—3 in Figure 1.

Referring more particularly to Figure 1, reference character 1 designates the side walls of the main valve casting which terminate at each end in a coupling flange 2 provided with bolt holes 3 for securing the flange between the separated ends of a pair of conduits through which the fluid to be controlled passes. The valve casting is provided with a conically shaped opening 4 which extends at right angles to the main openings through the conduits and is adapted rotatably to receive the plug portion 5 of the valve. This plug is provided with a transversely extending opening 6, the arrangement being such that when this opening is in line with the openings in the conduits, the valve is in open position.

The casting 1 is provided with an integrally connected extension 7 which contains a chamber or compartment 8 completely closed except for a vertically extending opening 9. The latter is threaded to receive a pipe plug 10.

The plug 5 is provided with a stem formed of a round portion 11 and a flattened portion 12, the stem being bored out as at 13 and the opening extending as far as the plug proper as indicated at 14.

The upper end of the valve casting 1 terminates in a rectangular flange 15 for receiving a cover plate 16 of similar configuration. The latter and the flange 15 are bolted together as indicated at 17.

The flange portion of the casing is provided with a countersunk recess 18, preferably of circular shape to receive a shouldered projection 19 of similar shape provided on the cover plate 16. There is a metal or flexible gasket 20 interposed between the shoulder 19 and the flat surface of the recess 18 in order to render the joint fluid-tight. This gasket extends inwardly as far as the stem portion 11.

The cover plate 16 is provided with a centrally positioned opening 21 of circular shape and of considerably greater space therebetween. This space receives a metal ring 22 which is chamfered at the two lower corners and rests upon the gasket 20. A number of rings of packing material 23 rest on the ring 22 and a gland member 24 is provided for applying pressure to the packing material, thus to prevent leakage within the annular space between the plug stem and the cover plate. Pressure is conveniently applied to the gland 24 by means of a clamp plate 25 of elongate shape and having wing portions 26 (Figure 2) which are provided with openings for loosely receiving a pair of bolts 27. The latter are threaded into the cover plate 16. There is a pair of lugs 28 extending downwardly from the clamp plate 25 and positioned on opposite sides of the plug stem 12 so as to bear against the gland member 24. Consequently, as the nuts 29 are tightened pressure is applied through the clamp plate 25 to the gland 24, causing the packing material 23 to expand laterally and thus to provide a fluid-tight joint about the plug stem 11.

The opening 13 in the stem 12 slidably receives a piston 30 which is carried on the lower end of a rod 31 and terminates at the top in a hexagonal head 32. This rod is journalled at the upper end in a screw plug 33 which is screwed into an enlarged opening at the top of the stem 12. A compression spring 34 is inserted within the opening 13 between the plug 33 and the rear face of the piston 30. The function of this spring is to continually apply pressure to the piston and thus force it downwardly. It is apparent that by removing the screw plug 33 all of the internal parts within the bore 13 may be taken out for inspection or replacement. This feature per se has been disclosed and claimed in my co-pending application Ser. No. 541,858, filed June 24, 1944.

The invention in the present case is directed more especially to an improved lubricating and scouring system for the plug in order to rid the contacting surfaces at the valve seat of any solid or liquid material which may tend to increase friction and thereby affect the life of the valve as a whole. As shown in Figures 1 and 2, the flange portion 15 of the valve casting is provided at one side (the left hand side as shown) with an inwardly extending opening 35 for receiving a fitting 36 of well known construction having a check valve 37 by which lubricant can be introduced under pressure into the opening. The flange 15 at the opposite side of the plug 5 is provided with a similar inwardly extending opening 38 for receiving a combined screw and spring-urged plunger valve indicated generally at 39 which causes the opening 38 to communicate with the atmosphere when pressure on the inside of the valve exceeds a predetermined amount according to the setting of the valve.

The plug 5 is provided at opposite sides thereof and in line with the openings 35, 38 with a pair of crescent shaped grooves 40. These grooves stop short of one another as can be plainly seen in Figure 3 so that there is no inter-connection. There is an opening 41 extending from the bottom of each of the openings 35 and 38 which communicates with the grooves 40. There is a radially extending opening 42 positioned between one of the grooves 40 (the left hand groove as shown) and the lower end of the bore 13 which has been illustrated as a small conically shaped compartment 14. In order to complete the lubricating system a pair of diametrally disposed grooves 43 extend along the length of the plug and communicate respectively with the partially circumferential grooves 40.

When lubricant under pressure is introduced for example by means of a grease gun at the fitting 36, this lubricant passes through the left hand opening 41, down through the left hand longitudinal groove 43 and into the compartment 8. In practice, this compartment is usually filled with grease before the plug is put into position so that the lubricant introduced by the gun forces lubricant out of the compartment 8 upwardly into the right hand groove 43 and thence into the right hand partially circumferential groove 40 and if desired, out through the right hand opening 41 and the valve 39. The crescent shaped configuration of the grooves 40 introduces no obstruction to the moving lubricant because the inner surface of each groove is continuous and yet there is no intercommunication between the grooves. Thus, a complete circuit for the lubricant is effected with the minimum friction and there is no way for this lubricant to "short circuit" any of the passageways as it must travel the entire length of the plug grooves 43 in order to reach the outlet 39. There is one other path for the lubricant to take and that is through the left hand opening 41, thence through the radial opening 42 into the small chamber 14 and as the pressure within this chamber builds up, the piston 30 is caused to be forced upwardly against the spring 34 which serves to maintain a relatively constant pressure on the lubricant throughout the entire groove system. It is apparent that the rod 31 under these circumstances will be caused to elevate, carrying with it the end nut 32 which will serve as a tell-tale in showing the amount and relative pressure of the lubricant contained within the bore 13 and at the lower side of the piston 30. The valve 39 is so set as to prevent any leakage of the lubricant at this point until the piston 30 has been moved upwardly throughout its entire travel and the system will no longer receive more lubricant.

In order to clean or scour out the valve without removing the plug 5, a cleansing fluid or if desired, a grease gun may be applied to the fitting 36. The pressure of the fluid thus introduced may be increased to such an extent as to cause the same freely to be spewed out at the valve 39, thus making sure that all of the passageways including the grooves 40 and 43 and the openings 41, are free from obstruction and that every portion of each groove receives its proper amount of lubricant. The compartment 8 may also be cleaned by removing the plug 9 and flushing out this compartment, using liquid or lubricant introduced at the fitting 36 under pressure. It will be understood that while I have shown and described the use of a grease gun fitting 36 for introducing the lubricant under pressure, I may instead employ a set screw form of plunger in which case, lubricant material may be introduced within the opening 35 in cartridge or stick form.

From the foregoing it is evident that I have disclosed an improved valve structure of the plug cock type in which the lubricating system as a whole can be cleansed from time to time without removing the plug and in which the cleansing material which may be the lubricant itself, is caused to flow the "long way" around the plug and there can be no "short circuit" of the lubricant across the plug. By turning the plug 5 during the cleansing action, as when the stem 12 is rotated in any suitable and well known manner, the valve seat 4 may also be rendered free of foreign material due to the long circuit path of the cleaning fluid or lubricant so that all parts of the bearing surfaces on the plug and the valve seat are maintained at all times in a friction-free condition. When the passageways are replenished with lubricant none of the stale lubricant is permitted to remain within any of the passageways. Moreover, the reservoir 14 receives its supply of lubricant directly from the lubricant gun, in fresh form and none of the lubricant remaining in any of the passageways can find its way back into the reservoir since the movement of the lubricant is always downwardly in the left hand groove and these grooves are not in communication with one another except at the compartment 8 which is remote from the reservoir 14.

It will be understood that I desire to comprehend within my invention such modifications as come within the scope of the claims and the invention.

Having thus fully described my invention, what I claim as new and desire to secure by Letters Patent, is:

1. A valve for controlling the flow of fluid through a pipe coupling, said coupling being provided with a main passageway and an angularly positioned bore communicating therewith, a valve plug within said bore adapted to rotate, a passageway laterally through said plug adapted to register with the coupling passageway when the plug is rotated, a plurality of grooves extending along the exterior surface of said plug lengthwise thereof and at least one of them extending the full length of the plug, a pair of circumferential grooves completely disconnected from one another, an opening extending longitudinally of the plug in the center and communicating with one of said circumferential grooves, and a spring-pressed plunger in said opening to force lubricant into said one circumferential groove, one of said grooves extending along the exterior surface of said plug and communicating with one of said circumferential grooves and another of said grooves extending along the exterior surface of said plug and communicating with the other of said circumferential grooves, the arrangement being such that lubricant may be introduced to the valve seat through one of the circumferential grooves, then to the longitudinal groove communicating therewith, finally to another of the longitudinal grooves and to the circumferential groove communicating therewith whereby the lubricant is forced down past the entire length of the plug at one side and then upwardly along the length of the plug at another side between the said circumferential grooves.

2. A valve for controlling the flow of fluid through a pipe coupling, said coupling being provided with a main passageway and an angularly positioned bore communicating therewith, a valve plug within said bore adapted to rotate, a passageway laterally through said plug adapted to register with the coupling passageway when the plug is rotated, said plug having a stem which is bored to receive a spring urged piston, a pair of openings at opposite sides of the valve and an opening within the plug in line with one of the openings in the valve and communicating with the bore in the stem, a pair of circumferential grooves disconnected from one another but arranged in line with said openings and at least a pair of longitudinally extending grooves which communicate respectively with said circumferential grooves, means contained in one of said openings in the valve for introducing lubricant under pressure to one of the circumferential grooves and thence into the bore of the stem, and means contained in the valve opening in line with its circumferential groove for permitting lubricant to be ejected from the valve.

3. A valve for controlling the flow of fluid through a pipe coupling, said coupling being provided with a main passageway and an angularly positioned bore communicating therewith, a valve plug within said bore adapted to rotate, a passageway laterally through said plug adapted to register with the coupling passageway when the plug is rotated, said plug having a stem which is bored to receive a spring urged piston, a pair of openings at opposite sides of the valve and an opening within the plug in line with one of the openings in the valve and communicating with the bore in the stem, a pair of circumferential grooves disconnected from one another but arranged in line with said openings and at least a pair of longitudinally extending grooves which communicate respectively with said circumferential grooves, means contained in one of said openings in the valve for introducing lubricant under pressure to one of the circumferential grooves and thence into the bore of the stem, and means contained in the valve opening in line with its circumferential groove for permitting lubricant to be ejected from the valve, said first-mentioned means comprising a fitting adapted to receive a pressure gun and the second mentioned means comprising a spring urged relief valve.

4. A valve for controlling the flow of fluid through a pipe coupling, said coupling being provided with a main passageway and an angularly positioned bore communicating therewith, a valve plug within said bore adapted to rotate, a passageway laterally through said plug adapted to register with the coupling passageway when the plug is rotated, and means for lubricating the entire length and circumferential area of the plug during rotation, said means including a lubricant injecting device at one end of the plug and a lubricant ejecting device at the same end of the plug but at the opposite side thereof, a pair of grooves extending circumferentially about the plug in line with said lubricant injecting and ejecting devices, said grooves being in communication respectively with said devices, and passageways extending longitudinally of the plug at opposite sides thereof and communicating respectively with said circumferential grooves, said longitudinal passageways communicating with one another at the end of the plug opposite from said injecting and ejecting devices whereby the lubricant introduced into the injecting device is constrained to travel through its respective circumferential groove, thence through at least two of the longitudinal passageways at opposite sides of the plug to the other of said circumferential groove and to leave the valve at said ejecting device.

5. A valve for controlling the flow of fluid through a pipe coupling, said coupling being provided with a main passageway and an angularly positioned bore communicating therewith, a valve plug within said bore adapted to rotate, a passageway laterally through said plug adapted to register with the coupling passageway when the plug is rotated, and means for lubricating the entire length and circumferential area of the plug during rotation, said means including a lubricant injecting device at one end of the plug and a lubricant ejecting device at the same end of the plug but at the opposite side thereof, a pair of grooves extending circumferentially about the plug in line with said lubricant injecting and ejecting devices, said grooves being in communication respectively with said devices, and passageways extending longitudinally of the plug at opposite sides thereof and communicating respectively with said circumferential grooves, said longitudinal passageways communicating with one another at the end of the plug opposite from said injecting and ejecting devices whereby the lubricant introduced into the injecting device is constrained to travel through its respective circumferential groove, thence through at least two of the longitudinal passageways at opposite sides of the plug to the other of said circumferential groove and to leave the valve at said ejecting device, each of said circumferential grooves being deeper at the middle and tapering to no depth at the ends, whereby the grooves offer no abrupt stoppage to the lubricant at the ends thereof, notwithstanding the separate relation of the grooves, said longitudinal passageways communicating with said grooves at the position thereof having the maximum depth.

OYSTEIN JACOBSEN.

REFERENCES CITED

The following references are of record in the file of this patent:

UNITED STATES PATENTS

| Number | Name | Date |
|---|---|---|
| 586,761 | Dixon | July 20, 1897 |
| 1,608,519 | Nordstrom | Nov. 30, 1926 |
| 1,961,102 | Fennema | May 29, 1934 |
| 2,026,891 | Haun | Jan. 7, 1936 |
| 2,069,965 | Morehead | Feb. 9, 1937 |
| 2,078,271 | Nordstrom | Apr. 27, 1937 |

FOREIGN PATENTS

| Number | Country | Date |
|---|---|---|
| 484,239 | Great Britain | May 3, 1938 |